(12) United States Patent
Ohki

(10) Patent No.: US 12,698,965 B2
(45) Date of Patent: Aug. 4, 2026

(54) DISTANCE MEASURING APPARATUS AND DISTANCE MEASURING METHOD

(71) Applicant: SONY SEMICONDUCTOR SOLUTIONS CORPORATION, Kanagawa (JP)

(72) Inventor: Mitsuharu Ohki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 688 days.

(21) Appl. No.: 18/248,413

(22) PCT Filed: Sep. 1, 2021

(86) PCT No.: PCT/JP2021/032166
§ 371 (c)(1),
(2) Date: Apr. 10, 2023

(87) PCT Pub. No.: WO2022/085310
PCT Pub. Date: Apr. 28, 2022

(65) Prior Publication Data
US 2023/0408254 A1 Dec. 21, 2023

(30) Foreign Application Priority Data
Oct. 20, 2020 (JP) .................................. 2020-175913

(51) Int. Cl.
*G01C 3/08* (2006.01)
*G01S 7/4861* (2020.01)
(52) U.S. Cl.
CPC .............. *G01C 3/08* (2013.01); *G01S 7/4861* (2013.01)

(58) Field of Classification Search
CPC ................................ G01C 3/08; G01S 7/4861
See application file for complete search history.

(56) References Cited

U.S. PATENT DOCUMENTS

2017/0322309 A1* 11/2017 Godbaz ..................... G06T 5/70
2017/0363740 A1 12/2017 Kubota
(Continued)

FOREIGN PATENT DOCUMENTS

CN 110187359 A 8/2019
CN 111487638 A 8/2020
(Continued)

OTHER PUBLICATIONS

International Search Report and Written Opinion of PCT Application No. PCT/JP2021/032166, issued on Nov. 2, 2021, 09 pages of ISRWO.

*Primary Examiner* — Mark Hellner
(74) *Attorney, Agent, or Firm* — CHIP LAW GROUP

(57) ABSTRACT

A distance measuring apparatus according to an embodiment of the present disclosure includes a light-receiving unit, a histogram acquiring unit, and an operation unit. The light-receiving unit receives reflected light from a distance measurement target. The reflected light is based on irradiation light from a light-emitting unit. The histogram acquiring unit acquires a histogram indicating the frequency of reception of the reflected light at the light-receiving unit. The operation unit calculates a distance to the distance measurement target on the basis of a time corresponding to a peak of the histogram acquired by the histogram acquiring unit. The operation unit corrects the distance calculated on the basis of the time corresponding to the peak of the histogram on the basis of the shape of the histogram acquired by the histogram acquiring unit.

11 Claims, 11 Drawing Sheets

(56) References Cited

U.S. PATENT DOCUMENTS

2018/0364360 A1*   12/2018   Zellinger ................ G01S 17/10
2022/0043128 A1*    2/2022   Pacala ................... G01S 7/4865

FOREIGN PATENT DOCUMENTS

JP            06-075048  A       3/1994
JP          2010091377  A   *   4/2010    ............ G01S 17/10
JP          2010256205  A      11/2010
JP          2015108629  A   *   6/2015    ............ G01S 17/89
JP          2016-211881 A      12/2016
JP          2020-521954 A       7/2020
JP          2020-118695 A       8/2020
JP          2021-050950 A       4/2021
WO          2013/047641 A1      4/2013
WO          2016/002776 A1      1/2016
WO     WO-2019102751  A1       5/2019

* cited by examiner

[FIG. 1]
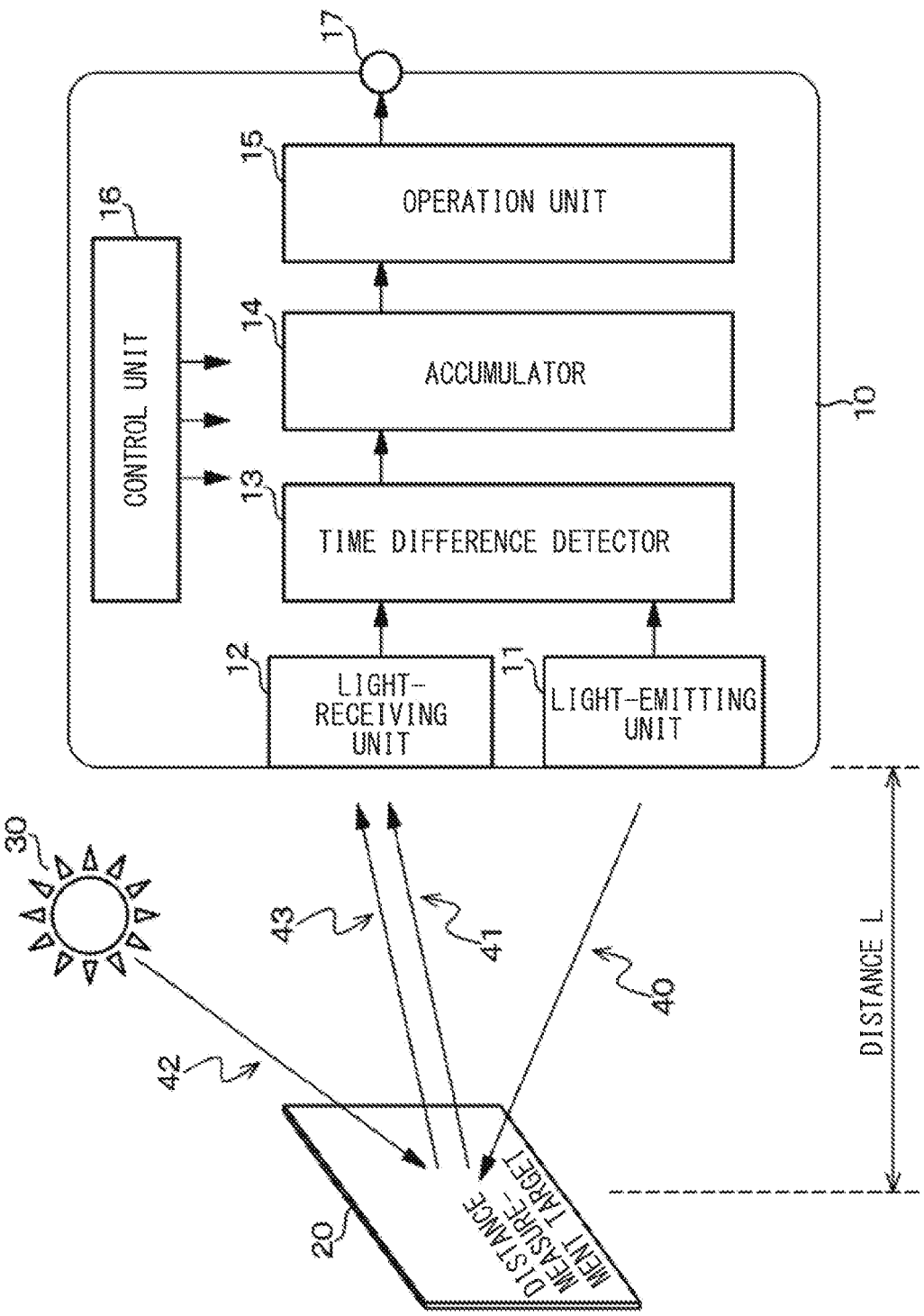

[FIG. 2]
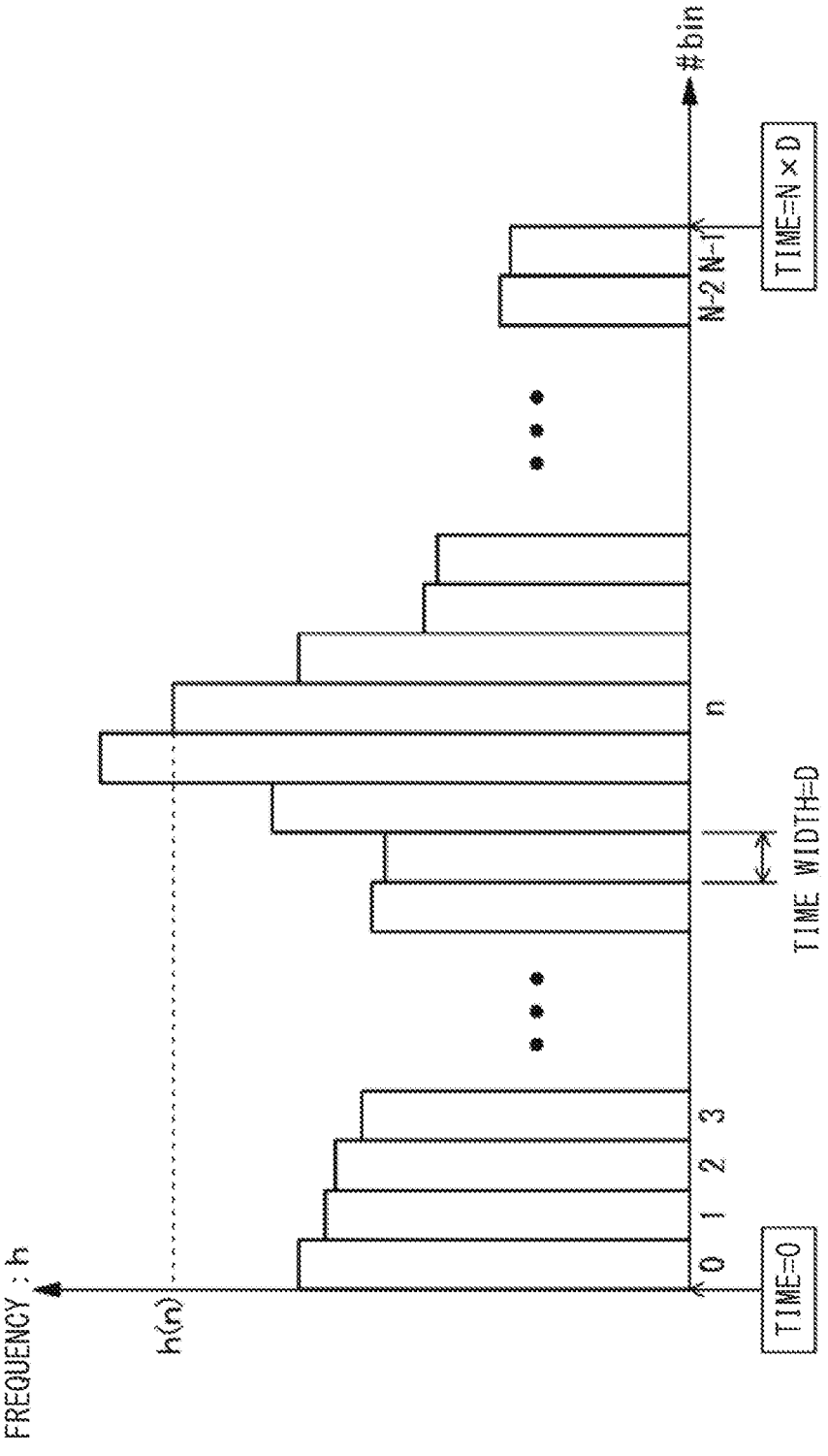

[FIG. 3]
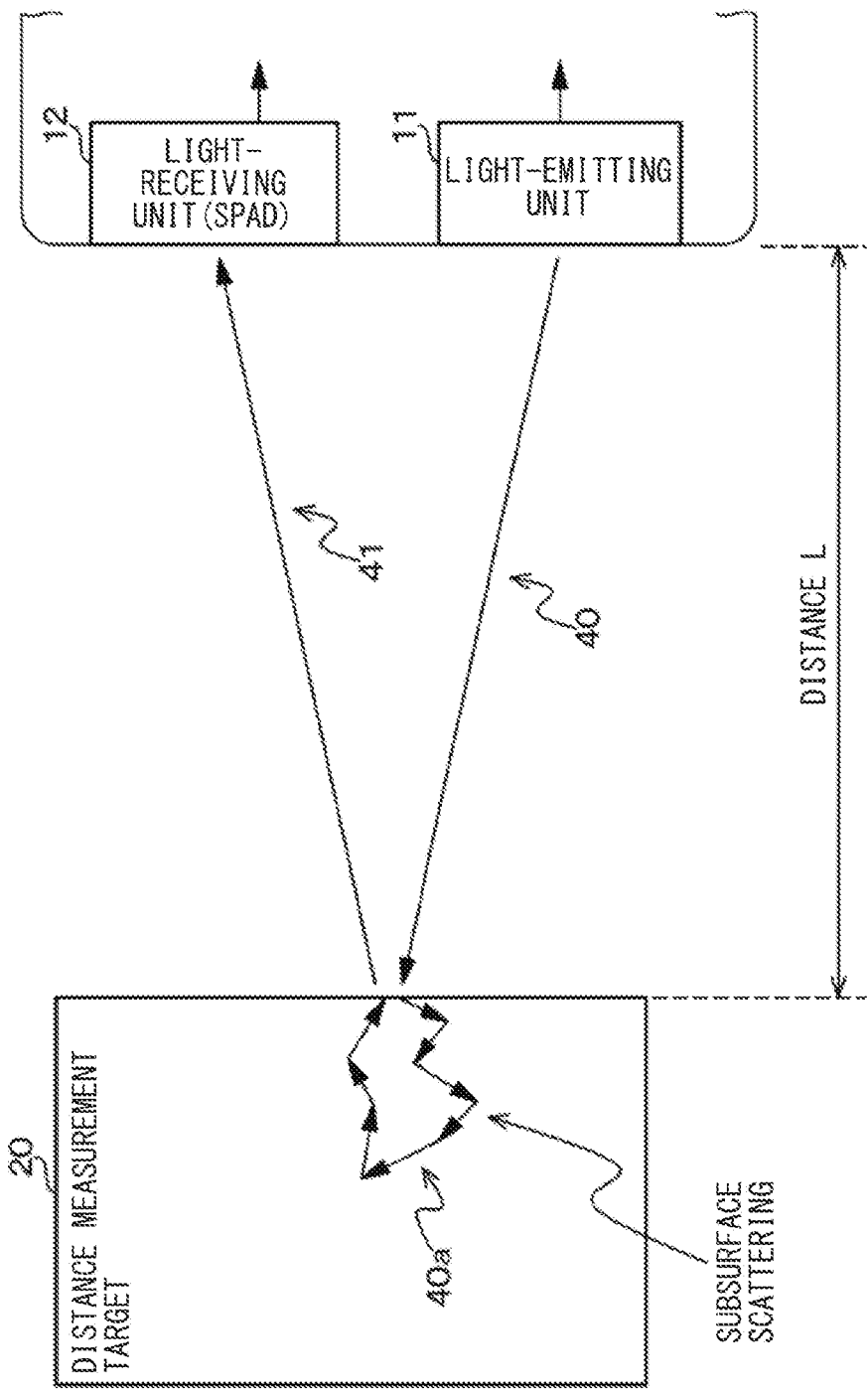

[FIG. 4]
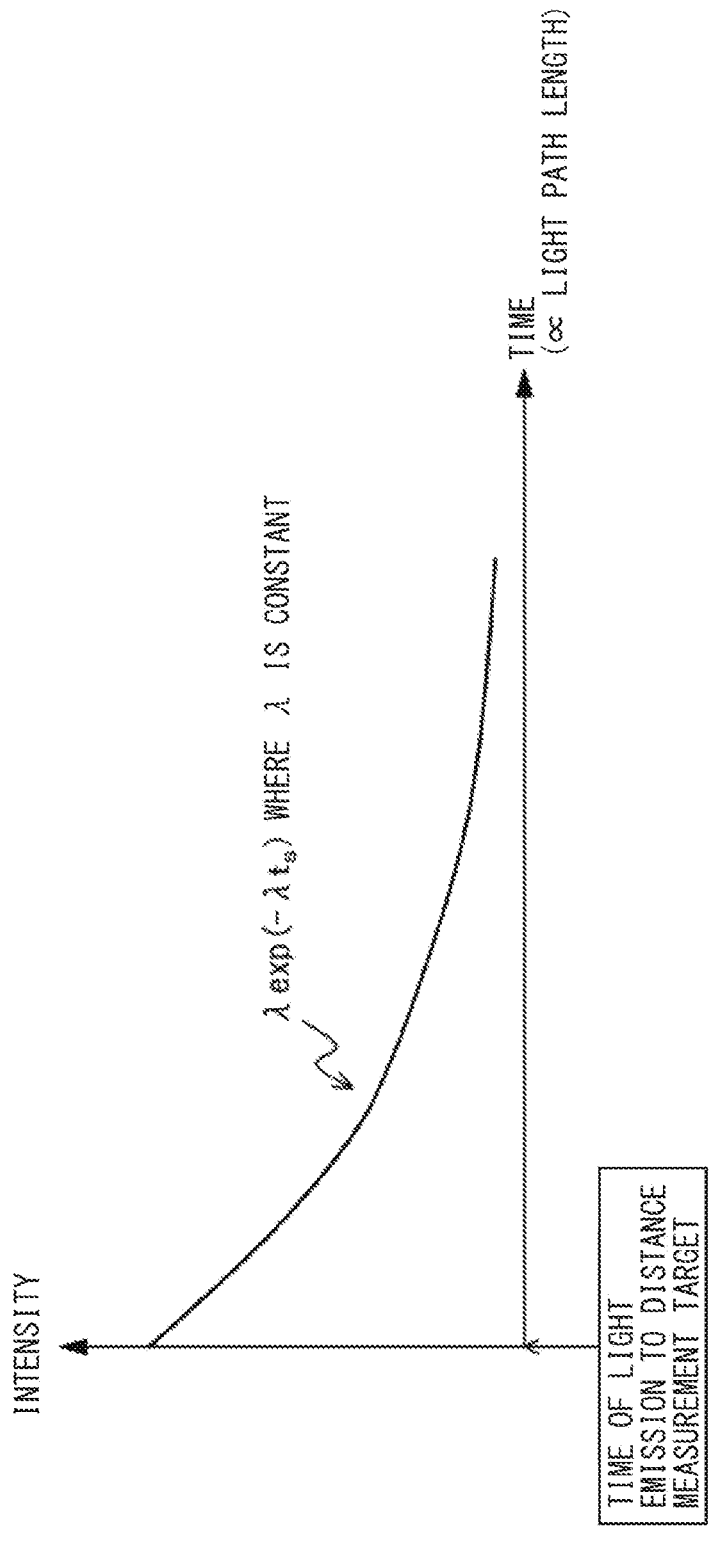

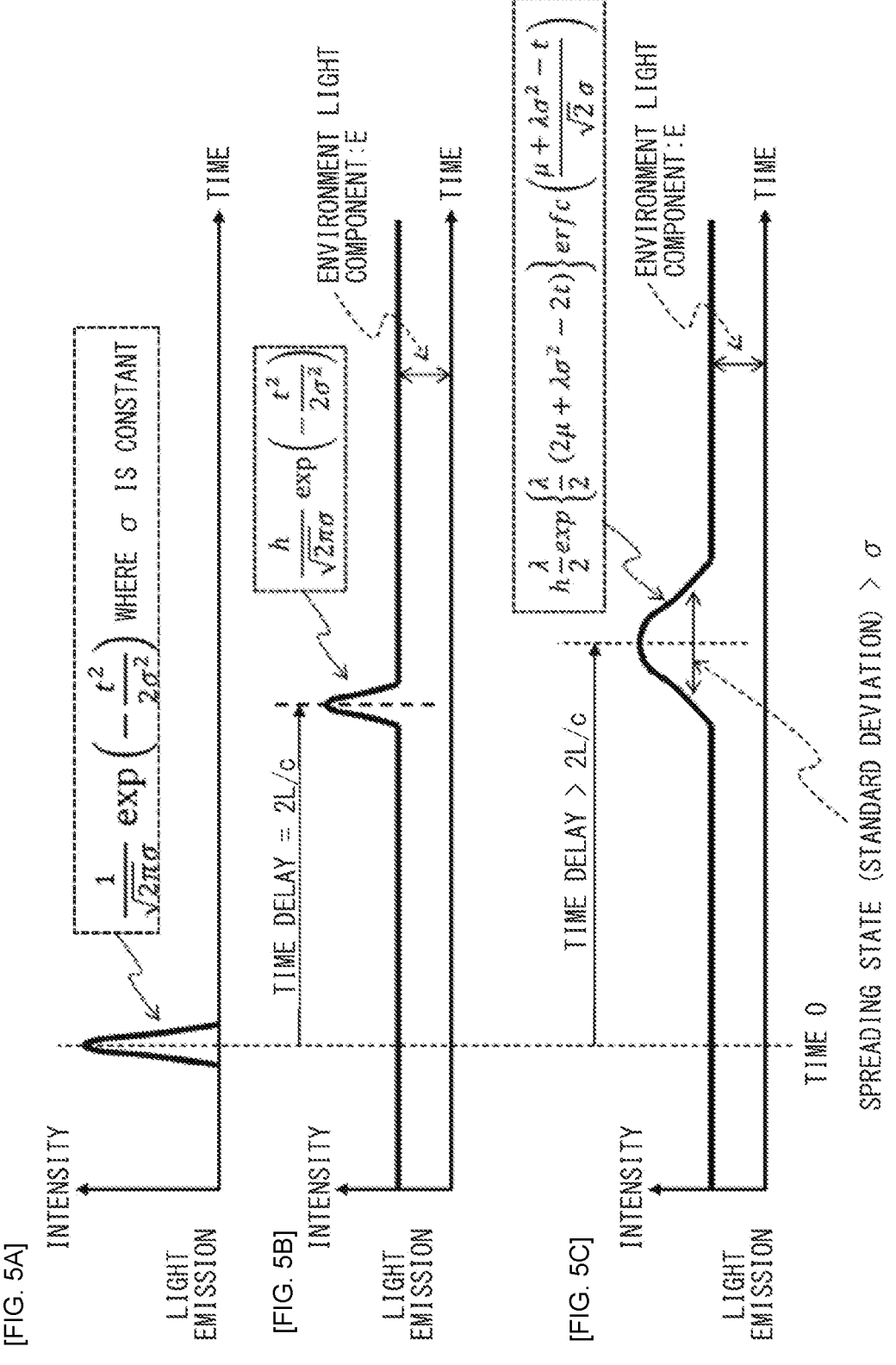

[FIG. 6]
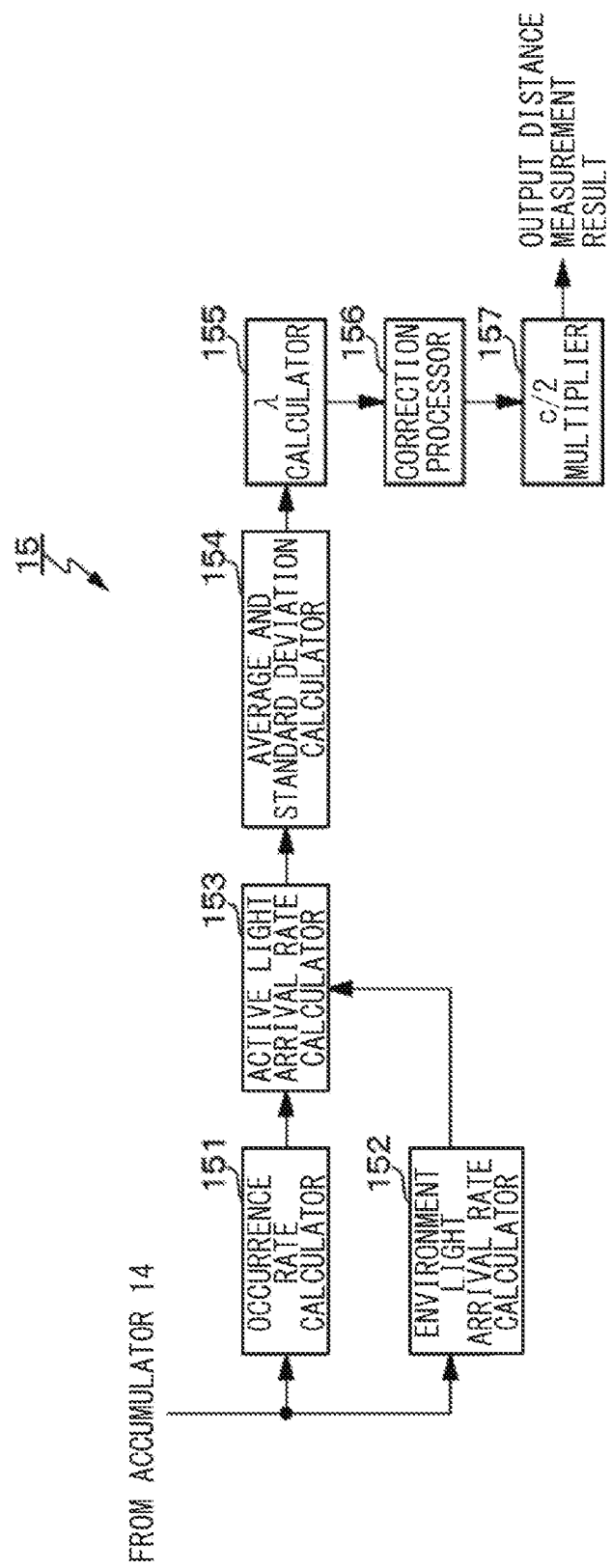

[FIG. 7A]
[FIG. 7B]
[FIG. 7C]
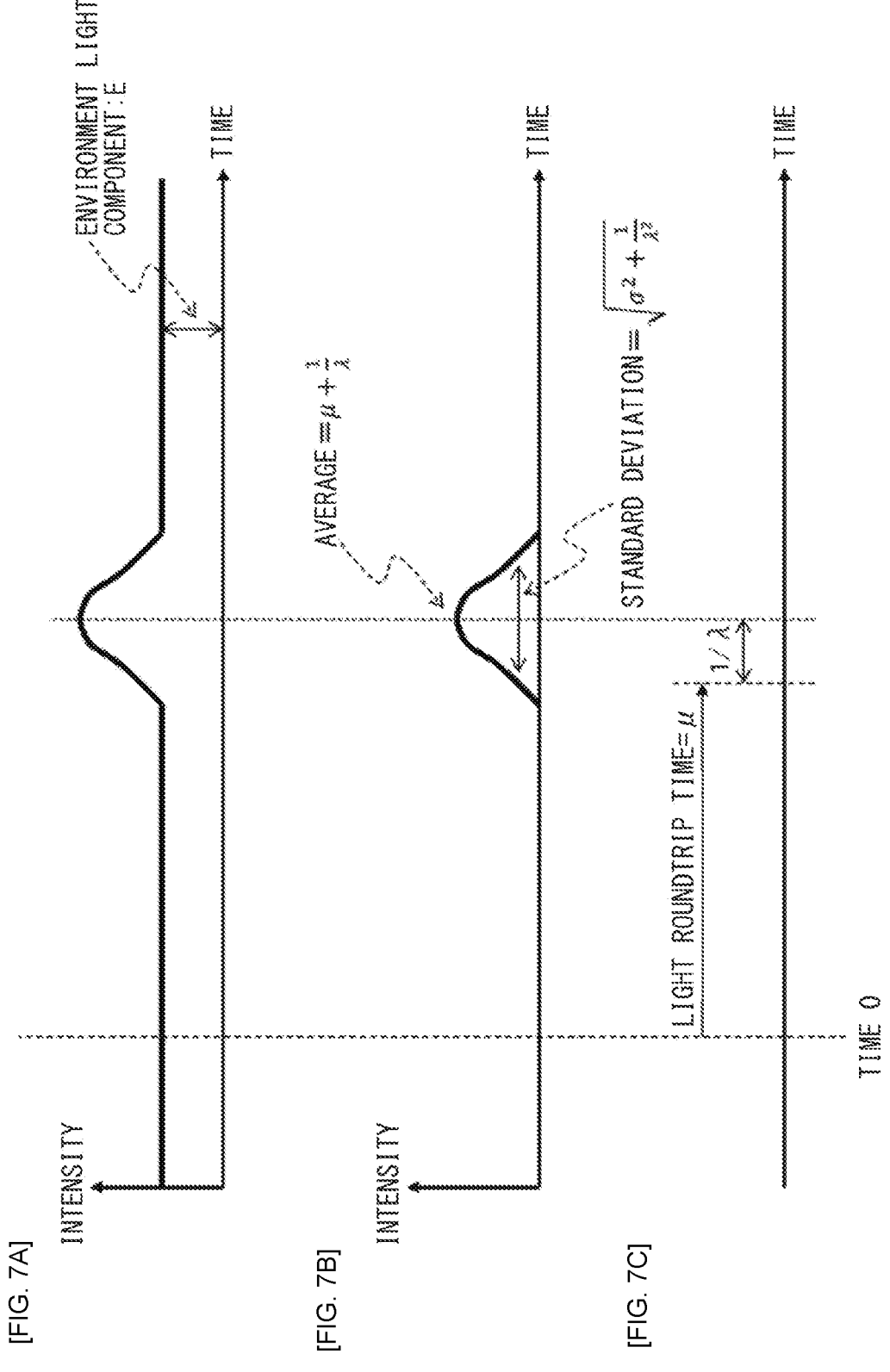

[FIG. 8]
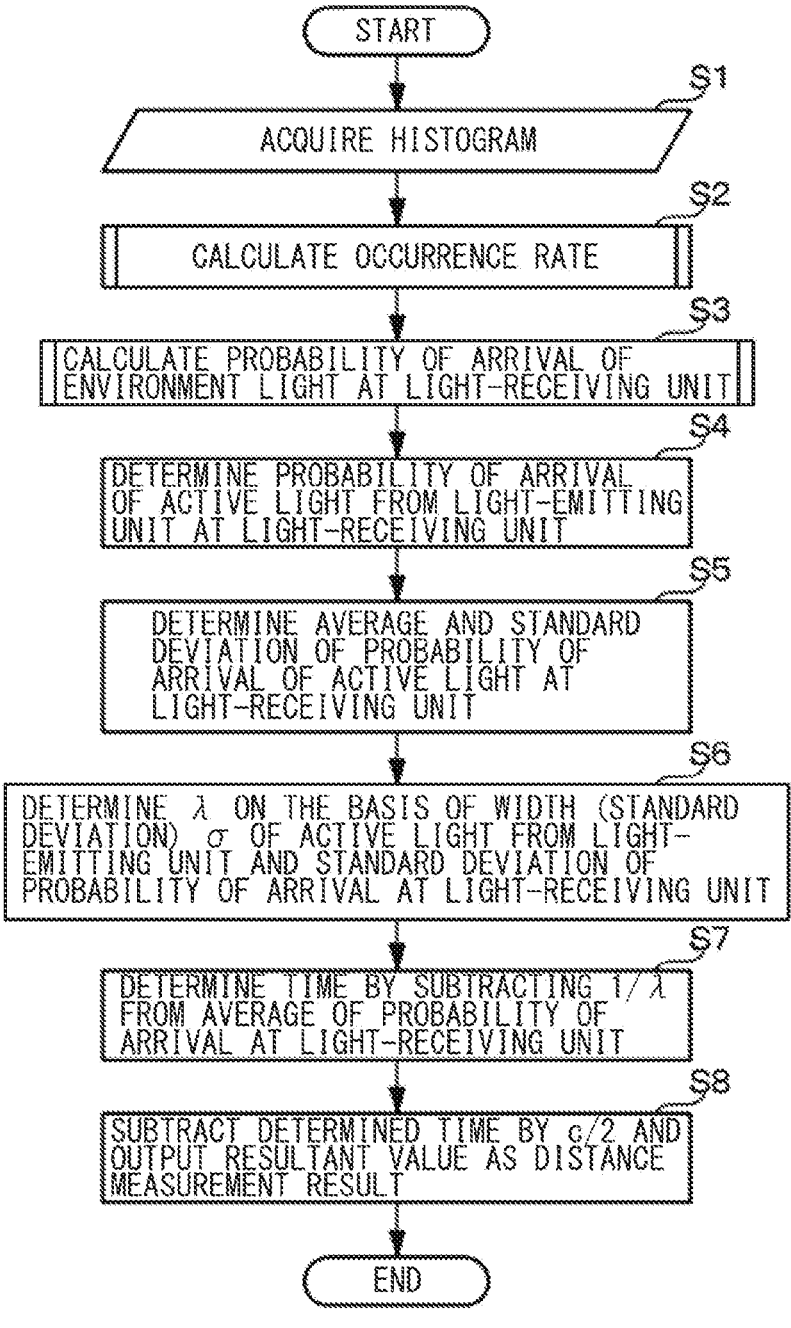

[FIG. 9]
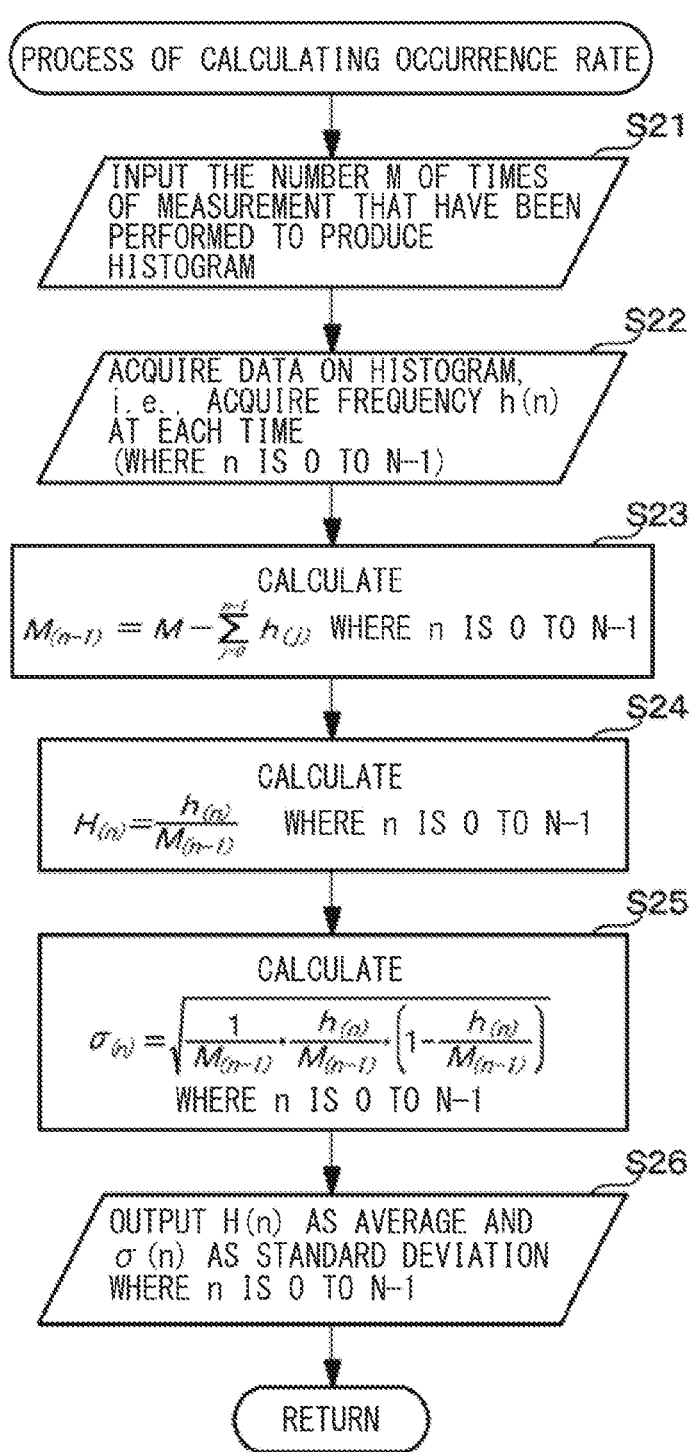

[FIG. 10]
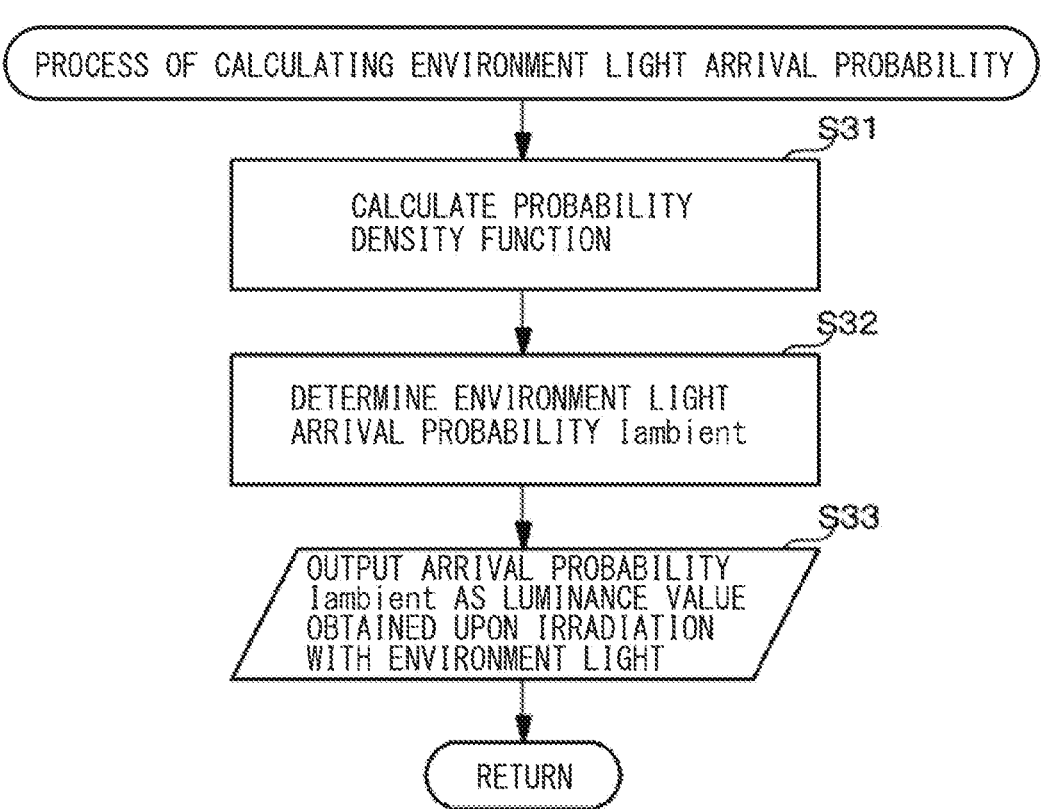

[FIG. 11]
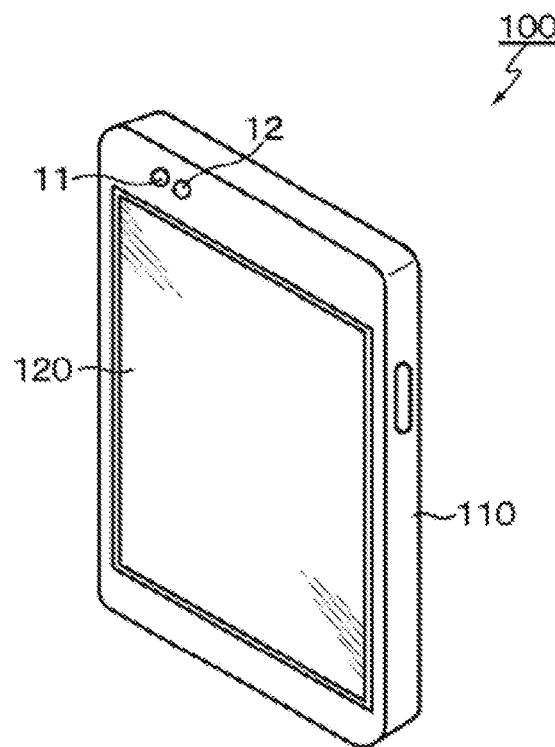

DISTANCE MEASURING APPARATUS AND DISTANCE MEASURING METHOD

CROSS REFERENCE TO RELATED APPLICATIONS

This application is a U.S. National Phase of International Patent Application No. PCT/JP2021/032166 filed on Sep. 1, 2021, which claims priority benefit of Japanese Patent Application No. JP 2020-175913 filed in the Japan Patent Office on Oct. 20, 2020. Each of the above-referenced applications is hereby incorporated herein by reference in its entirety.

TECHNICAL FIELD

The present disclosure relates to a distance measuring apparatus and a distance measuring method.

BACKGROUND ART

A device (a sensor) using a Time-of-Flight (ToF) system is known as a distance measuring apparatus that measures a distance to a distance measurement target (an object) (a so-called ranging apparatus) (see PTL 1, for example). The ToF system is a system to measure a distance to a distance measurement target by detecting the time of flight of light from emission of irradiation light from a light-emitting unit (a light source) to the distance measurement target to reception of the irradiation light reflected from the distance measurement target at a light-receiving unit.

CITATION LIST

Patent Literature

PTL 1: Japanese Unexamined Patent Application Publication No. 2016-211881

SUMMARY OF THE INVENTION

Meanwhile, some distance measurement targets cause so-called subsurface scattering, which is a phenomenon in which light incident on the surface of an object scatters inside the object and is then discharged to the outside. If the light emitted from a light-emitting unit is reflected from the surface of the distance measurement target, it is possible to accurately measure the distance to the distance measurement target. However, in a case where the distance measurement target is an object that causes subsurface scattering, the time from emission of light from the light-emitting unit to reception of the light at the light-receiving unit includes time attributed to the subsurface scattering. Thus, it is not possible to accurately measure the distance to the distance measurement target.

An existing technique fails to take into consideration the time attributed to subsurface scattering inside the distance measurement target. Thus, in a case where the distance measurement target is an object that causes subsurface scattering, it is not possible for the existing technique to accurately measure the distance to the distance measurement target.

It is desirable to provide a distance measuring apparatus and a distance measuring method each taking into consideration the time attributed to subsurface scattering inside a distance measurement target and making it possible to accurately measure the distance to a distance measurement target in a case where the distance measurement target is an object that causes subsurface scattering.

A distance measuring apparatus according to an embodiment of the present disclosure includes a light-receiving unit, a histogram acquiring unit, and an operation unit. The light-receiving unit receives reflected light from a distance measurement target. The reflected light is based on irradiation light from a light-emitting unit. The histogram acquiring unit acquires a histogram indicating the frequency of reception of the reflected light at the light-receiving unit. The operation unit calculates a distance to the distance measurement target on the basis of a time corresponding to a peak of the histogram acquired by the histogram acquiring unit. The operation unit corrects the distance calculated on the basis of the time corresponding to the peak of the histogram on the basis of the shape of the histogram acquired by the histogram acquiring unit.

A distance measuring method according to an embodiment of the present disclosure causes a distance measuring apparatus including a light-receiving unit that receives, from a distance measurement target, reflected light based on irradiation light from a light-emitting unit, and a histogram acquiring unit that acquires a histogram indicating the frequency of reception of the reflected light at the light-receiving unit to calculate the distance to a distance measurement target on the basis of a time corresponding to a peak of the histogram acquired by the histogram acquiring unit, and correct the distance calculated on the basis of the time corresponding to the peak of the histogram on the basis of a shape of the histogram acquired by the histogram acquiring unit.

BRIEF DESCRIPTION OF DRAWINGS

FIG. 1 is a block diagram illustrating an example of a configuration of a distance measuring apparatus according to one embodiment of the present disclosure.

FIG. 2 is a diagram illustrating an example of a histogram generated by an accumulator of the distance measuring apparatus according to one embodiment of the present disclosure.

FIG. 3 is a diagram describing a distance measurement error caused by subsurface scattering inside a distance measurement target.

FIG. 4 is a diagram illustrating the intensity of light emitted from the distance measurement target at each time when light emitted for a short time is incident on the surface of the distance measurement target.

FIGS. 5A, 5B, and 5C FIG. 5A is a waveform diagram of active light emitted from a light-emitting unit to the distance measurement target, FIG. 5B is a waveform diagram of light received at the light-receiving unit in a case where the distance measurement target causes no subsurface scattering, and FIG. 5C is a waveform diagram of light received at the light-receiving unit in a case where the distance measurement target causes subsurface scattering.

FIG. 6 is a block diagram illustrating an example of a function of an operation unit in the distance measuring apparatus according to one embodiment of the present disclosure.

FIGS. 7A, 7B, and 7C FIG. 7A is a waveform diagram of light received at the light-receiving unit in a case where the distance measurement target causes subsurface scattering, FIG. 7B is a waveform diagram illustrating a change over time in the probability of arrival of the active light emitted from the light-emitting unit at a SPAD element of the light-receiving unit, and FIG. 7C is a diagram illustrating the result of a distance correction process.

FIG. 8 is a flowchart illustrating an example of a processing procedure of a distance measuring method executed by the operation unit.

FIG. 9 is a flowchart illustrating an example of a process of calculating an occurrence rate.

FIG. 10 is a flowchart illustrating an example of a process of calculating the probability of arrival of environment light at the SPAD element.

FIG. 11 is an external view of a smartphone according to a specific example of an electronic device to which the technology of the present disclosure is applicable as seen from a front side.

MODES FOR CARRYING OUT THE INVENTION

In the following, some embodiments for carrying out the technology of the present disclosure (hereinafter referred to as "embodiments") are described in detail with reference to the drawings. However, the technology of the present disclosure should not be limited to these embodiments. In the following description, components including the same elements or the same functions are denoted by the same reference numerals to omit redundant description. It is to be noted that description is given in the following order.

1. Overall Description of Distance Measuring Apparatus and Distance Measuring Method of Present Disclosure
2. Distance Measuring Apparatus According to Embodiment of Present Disclosure
2-1. Configuration Example of Distance Measuring Apparatus
2-2. Histogram
2-3. Distance Measurement Error Due to Subsurface Scattering
2-4. Functional Block of Operation Unit
2-5. Distance Measuring Method
2-5-1. Distance Measuring Process Performed by Operation Unit
2-5-2. Process of Calculating Occurrence Rate
2-5-3. Process of Calculating Probability of Arrival of Environment Light
3. Modification Example
4. Application Example of Technology of Present Disclosure (Smartphone)
5. Possible Configurations of Present Disclosure

Overall Description of Distance Measuring Apparatus and Distance Measuring Method of Present Disclosure According to a distance measuring apparatus and a distance measuring method of the present disclosure, a light-receiving element of a light-receiving unit may be an avalanche photodiode that operates in the Geiger mode, preferably, a single-photon avalanche diode.

According to the distance measuring apparatus and the distance measuring method of the present disclosure each including the preferred configuration described above, a distance measurement target may be an object that causes subsurface scattering.

Further, according to the distance measuring apparatus and the distance measuring method of the present disclosure each including the preferred configuration and embodiment described above, a histogram acquiring unit may include a time difference detector and an accumulator. The time difference detector detects the time from a time point when a light-emitting unit emits irradiation light to reception of reflected light from the distance measurement target at a light-receiving unit. The accumulator produces a histogram on the basis of the time detected by the time difference detector. Further, the shape of the histogram is the spreading state around a peak of a distribution of the reflected light from the distance measurement target. The spreading state is obtained by conducting a predetermined statistical process on the histogram acquired by the histogram acquiring unit.

Further, according to the distance measuring apparatus and the distance measuring method of the present disclosure each including the preferred configuration and embodiment described above, an operation unit may measure the spreading state around the peak of the distribution of the reflected light from the distance measurement target, calculate a correction amount from the spreading state around the peak, and perform correction on the basis of the calculated correction amount. Further, the operation unit may perform the correction of the distance by subtracting the correction amount calculated from the spreading state around the peak from the peak of the distribution of the reflected light.

Further, according to the distance measuring apparatus and the distance measuring method of the present disclosure each including the preferred configuration and embodiment described above, the distribution of the reflected light may be obtained by subtracting an environment light component from the histogram acquired by the histogram acquiring unit, and the spreading state around the peak of the distribution of the reflected light is a standard deviation. Further, the correction amount calculated from the spreading state around the peak is an inverse of an exponential distribution parameter determined from the standard deviation.

Distance Measuring Apparatus According to Embodiment of Present Disclosure

The distance measuring apparatus according to an embodiment of the present disclosure (hereinafter simply referred to as the "present embodiment" as needed) employs a ToF system as a system to measure a distance to the distance measurement target. In the ToF system, a time of flight from emission of pulse light (e.g., laser light having a peak wavelength in an infrared wavelength region) to the distance measurement target to reception of the light reflected from the distance measurement target.

The ToF system is categorized into two types: an indirect ToF system and a direct ToF system. The indirect ToF is a system to measure the distance to the distance measurement target by detecting a cycle of reception, at the light-receiving unit, of reflected light obtained as a result of reflection of pulse light emitted from the light-emitting unit in a predetermined cycle from the distance measurement target, and measuring the time of flight of the light on the basis of a phase difference between the cycle of light emission and the cycle of light reception. The direct ToF is a system to measure the distance to the distance measurement target directly from a flight time difference of light. In the distance measuring apparatus according to the present embodiment, the latter system, i.e., the direct ToF system is used as the ToF system.

Configuration Example of Distance Measuring Apparatus

FIG. 1 is a block diagram illustrating an example of a configuration of the distance measuring apparatus according to an embodiment of the present disclosure. As illustrated in FIG. 1, a distance measuring apparatus 10 according to the present embodiment includes a light-emitting unit 11, a light-receiving unit 12, a time difference detector 13, an accumulator 14, an operation unit 15, a control unit 16, and an output terminal 17. The distance measuring apparatus 10 is configured to measure a distance to a distance measurement target 20 using the direct ToF system. Here, the distance to the distance measurement target 20 is referred to as a distance L.

The light-emitting unit 11, the light-receiving unit 12, the time difference detector 13, the accumulator 14, and the operation unit 15 perform respective processes under the control of the control unit 16 including an information processing device such as central processing unit (CPU). Hereinafter, the respective processes performed by the light-receiving unit 12, the time difference detector 13, the accumulator 14, and the operation unit 15 under the control of the control unit 16 are described.

The light-emitting unit 11 may include a laser light source as a light source (a light-emitting element), for example. Under the control of the control unit 16, the light-emitting unit 11 causes the laser light source to emit light for a short time, and pulse light 40 as active light reaches the distance measurement target 20. The pulse light 40 emitted from the light-emitting unit 11 is reflected from the distance measurement target 20 and returns as reflected light 41 to the light-receiving unit 12.

As a matter of course, the pulse light 40 emitted from the light-emitting unit 11 toward the distance measurement target 20 is not always reflected and returned from the distance measurement target 20. That is, in a stochastic sense, the pulse light 40 is reflected and returned from the distance measurement target 20 in some cases and is not returned from the distance measurement target 20 in other cases.

In addition to the light emitted from the light-emitting unit 11, light 42 from the sun 30 reaches the distance measurement target 20 as environment light. The light 42 from the sun 30 is reflected from the distance measurement target 20, and reaches the light-receiving unit 12 as light 43.

Like a pixel array unit of an imaging device, the light-receiving unit 12 includes a two-dimensional array of pixels each including a light-receiving element. The light-receiving unit 12 receives, from the distance measurement target 20, the reflected light 41 that is based on the pulse light 40 emitted from the light-emitting unit 11 toward the distance measurement target 20. The light-receiving unit 12 includes an incident section provided with a lens (not illustrated). A converging operation of the lens enables the pixel including the light-receiving element to effectively receive the reflected light 41 from the distance measurement target 20. It is to be noted that illustration of the lens is omitted herein as the lens is not a major component.

In the distance measuring apparatus 10 according to the present embodiment, the light-emitting element of the light-receiving unit 12 is an element that generates a signal in response to reception of a photon. For example, the light-emitting element of the light-receiving unit 12 is a single photon avalanche diode (SPAD) element. The SPAD element is one kind of avalanche photodiodes having light receiving sensitivity increased by using a phenomenon called an avalanche multiplication. The SPAD element operates in the Geiger mode in which the element is operated at a reverse voltage greater than a breakdown voltage.

It is to be noted that, although the SPAD element is exemplified as the light-receiving element of the light-receiving unit 12 in the present embodiment, the light-receiving element of the light-receiving unit 12 is not limited to the SPAD element. That is, as the light-receiving element of the light-receiving unit 12, various elements that operate in the Geiger mode, such as an avalanche photodiode (APD) or a silicon photomultiplier (SiPM), may be used as well as the SPAD element.

The time difference detector 13 employs the ToF system, more specifically, the direct ToF system as a distance measuring system. In general, the time difference detector 13 is a time-to-digital converter (TDC). Under the control of the control unit 16, the time difference detector 13 measures the time from a time point when the light-emitting unit 11 emits the pulse light 40 (i.e., a time of light emission) to a time point when the light-receiving unit 12 receives the reflected light 41 (i.e., a time of light reception). That is, the time difference detector 13 measures the time from the time of light emission from the light-emitting unit 11 to the time of light reception at the light-receiving unit 12. Thereafter, the measured time is multiplied by a light speed c, and the resultant value is divided by 2. As a result, the distance to the distance measurement target 20 is determined. A reason why the resultant values is divided by 2 is that the measured time is a time taken by light traveling to the distance measurement target 20 and back.

Meanwhile, distance measurement based on a single emission of light from the light-emitting unit 11 and a single reception of the light at the light-receiving unit 12 may result in an erroneous determination. One reason for this is that the SPAD element (SPAD sensor) of the light-receiving unit 12 may react to external light (environment light) incident on the light-receiving unit 12 within the time from the emission of light from the light-emitting unit 11 to the reception of the light reflected from the distance measurement target 20 at the light-receiving unit 12. Another reason is that the pulse light 40 emitted from the light-emitting unit 11 does not always return to the light-receiving unit 12 after being reflected from the distance measurement target 20. These are events stochastically occurs.

For the reasons described above, light is emitted from the light-emitting unit 11 multiple times M (e.g., several thousand times to several tens of thousand times) for a short time under the control of the control unit 16. That is, the distance measuring apparatus 10 according to the present embodiment performs the multiple times M of measurements of the light emission and the light reception, and detects preferential data from the results of the multiple times M of the measurements.

The result of the detection by the time difference detector 13, i.e., the value of the measured time is sent to the accumulator 14. The accumulator 14 includes a memory (not illustrated) in which histogram data is formed. Details of the histogram will be described later. The accumulator 14 increments a histogram BIN corresponding to a time value by "1" to update the histogram.

It is to be noted that the time difference detector 13 and the accumulator 14 are examples of a histogram acquiring unit described in the claims, i.e., a histogram acquiring unit that acquires a histogram indicating the frequency of the reception of reflected light at the light-receiving unit 12. After the multiple times M of the measurements, data on the final histogram acquired by the accumulator 14 is sent to the operation unit 15.

The operation unit 15 calculates the distance L to the distance measurement target 20 on the basis of a time corresponding to a peak of the final histogram acquired by the accumulator 14. Further, the operation unit 15 corrects the information on the distance L calculated from the time corresponding to the peak of the histogram on the basis of the shape of the final histogram acquired by the accumulator 14. The information acquired through the process performed by the operation unit 15 (i.e., the information on the distance to the distance measurement target 20) is outputted from the output terminal 17.

Meanwhile, the SPAD element used as the light-receiving element of the light-receiving unit 12 is a sensor that detects the light (photon) coming first. Accordingly, accurate distance measurement is achievable if the light 41, which is an incident light beam generated as a result of reflection of the pulse light 40 emitted from the light-emitting unit 11 from the distance measurement target 20 comes earlier than the light 43, which is an incident light beam generated as a result of reflection of the light 42 emitted from the sun 30 from the distance measurement target 20.

Hereinafter, the light 41, which is an incident light beam generated as a result of reflection of the pulse light 40 emitted from the light-emitting unit 11 from the distance measurement target 20 is referred to as active light, and the light 43, which is an incident light beam generated as a result of reflection of the light 42 emitted from the sun 30 from the distance measurement target 20 is referred as environment light as needed.

The time detected by the time difference detector 13 is a roundtrip time to the distance measurement target 20. The time detected by the time difference detector 13 is multiplied by c/2 (where c is a light speed) to thereby calculate the distance L to the distance measurement target 20. In contrast, if the light 43 comes earlier than the light 41, it is not possible to measure an accurate time for the distance measurement.

The reception of the light 43, which is the environment light (i.e., the reception of the environment light) always occurs with a fixed probability regardless of time. In contrast, the reception of the light 41, which is the active light (i.e., the reception of the active light) occurs concentrically at a certain time (more specifically, a value obtained by dividing twice the distance to the distance measurement target 20 by the light speed c). Accordingly, a peak is detected from the histogram, and the time corresponding to the peak is determined to determine the distance L to the distance measurement target 20.

As described above, the operation unit 15 performs the process of detecting the peak from the histogram and the process of calculating the distance L by multiplying the time corresponding to the peak by c/2 under the control of the control unit 16. Details of functions of the operation unit 15 will be described later.

[Histogram]

Now, a description is made regarding the histogram indicating the frequency of reception of reflected light at the light-receiving unit 12. FIG. 2 is a diagram illustrating an example of a histogram generated by the accumulator 14 of the distance measuring apparatus 10 according to an embodiment of the present disclosure.

In this histogram, time (a horizontal axis) is represented in units of a width D. That is, in a case where the value of the time detected by the time difference detector 13 is within a range from a time 0 to a time D, the frequency is added to a 0th bin. In a case where the value of the time detected by the time difference detector 13 is within a range from time D to a time 2D, the frequency is added to a first bin. In a case where the value of the time detected by the time difference detector 13 is within a range from the time 2D to a time 3D, the frequency is added to a second bin. The same applies to subsequent ranges: In a case where the value of the time detected by the time difference detector 13 is within a range from a time (N−1)×D to a time N×D, the frequency is added to a (N−1)th bin.

Here, D is a resolution of the TDC.

It is to be noted that a measurement time for a single time of the measurement is limited by N×D. That is, if no light is received by the light-receiving unit 12 despite of an elapse of the time N×D from light emission from the light-emitting unit 11, the measurement ends after the elapse of the time N×D. In this case, the time difference detector 13 does not output a time value, and the accumulator 14 does not update the histogram. Here, N is a constant.

Thus, if all of the frequencies in the bins of the final histogram obtained after the M times of measurement are summed up, the sum total is less than M in some cases.

The histogram is represented by h(n) where n represents a bin number and is an integer greater than or equal to 0 and less than or equal to N−1.

Distance Measurement Error Due to Subsurface
Scattering

Meanwhile, some distance measurement targets 20 cause so-called subsurface scattering, which is a phenomenon in which light incident on the surface of an object scatters inside the object and is then discharged to the outside. Examples of the object that cause subsurface scattering may include a human skin, for example. If light emitted from the light-emitting unit 11 is reflected from the surface of the distance measurement target 20, it is possible to accurately measure the distance to the distance measurement target 20. However, if the distance measurement target 20 is an object that causes subsurface scattering, the time from the time of light emission from the light-emitting unit 11 to the time of light reception at the light-receiving unit 12 includes the time attributing to the subsurface scattering. Accordingly, it is not possible to accurately measure the distance to the distance measurement target 20. That is, a distance measurement error is generated.

Now, the distance measurement error caused by the subsurface scattering inside the distance measurement target 20 is described with reference to FIG. 3. FIG. 3 illustrates components extracted from FIG. 1 that are necessary to explain the distance measurement error caused by the subsurface scattering.

In FIG. 3, the distance measurement target 20 is an object that causes subsurface scattering. In this case, the light 40 emitted from the light-emitting unit 11 enters the distance measurement target 20 and causes subsurface scattering 40a as illustrated in FIG. 3. Thereafter, the light 41 travels to the outside of the distance measurement target 20 as illustrated in FIG. 3. Accordingly, a light path length is the sum total of a light path of the light 40, a light path of the subsurface scattering 40a, and a light path of the light 41 illustrated in FIG. 3. That is, the light path length is longer than the sum total of the light path of the light 40 and the light path of the light 41 in FIG. 3 by the light path of the subsurface scattering 40a. Thus, the result of the distance measurement has a value larger than the actual distance L.

It is to be noted that, although only a single light path of the subsurface scattering 40a is illustrated in FIG. 3, multiple light paths of the subsurface scattering are present in fact. That is, some light beams exit to the outside after causing the scattering inside the distance measurement target 20 for a long time (i.e., in a long light path length), whereas other light beams exit to the outside after causing the scattering inside the distance measurement target 20 for a short time (i.e., in a short light path length).

The light staying inside the distance measurement target 20 for a longer time has a longer light path and is absorbed by a larger amount accordingly. The time of stay inside the distance measurement target 20 is represented by a time ts. The intensity of light emitted from the distance measurement target 20 after an elapse of the time ts from the incidence of light on the distance measurement target 20 may be approximated as the following exponential distribution, for example.

[Expression 1]

$$\begin{cases} \lambda \exp(-\lambda t_s), & \text{if } t_s \ge 0 \\ 0, & \text{if } t_s < 0 \end{cases} \tag{1}$$

Here, $\lambda$ represents an object-specific value. The object-specific value $\lambda$ is smaller as the object is more susceptible to subsurface scattering.

A supplementary explanation for this is made with reference to FIG. 4. FIG. 4 illustrates the intensity of light emitted from the distance measurement target 20 at each time when the surface of the distance measurement target 20 is irradiated with light emitted for a short time. Here, the light emission for a short time is a momentary light emission which is a short-time light emission that is able to be approximated as a delta function.

In the above description, the light emitted is a delta function; however, in fact, the light emitted from the light-emitting unit 11 (i.e., the light incident on the distance measurement target 20) has a width in a time direction. For example, in a case where the light emitted from the light-emitting unit 11 is able to be approximated as a normal distribution, the intensity of the light emitted from the light-emitting unit 11 at a time t is represented by the following expression.

[Expression 2]

$$\frac{1}{\sqrt{2\pi}\,\sigma} \exp\left(-\frac{t^2}{2\sigma^2}\right) \tag{2}$$

Here, $\sigma$ is a standard deviation. Further, the expression (2) is normalized so as to become 1 when being integrated in the time direction.

It is to be noted that the value of the standard deviation a in the expression (2) is measured in advance and thus a known value. For example, an object which includes a material such as metal and causes no surface scattering is placed in front of the distance measuring apparatus 10 in a dark room. The distance to the object is then measured in advance and a histogram is produced. Thereafter, the standard deviation a is determined on the basis of the shape of the histogram, more specifically, the spreading state around a peak of the distribution of the reflected light from the distance measurement target. The spreading state is obtained by conducting a predetermined statistical process on the histogram.

FIG. 5A illustrates a waveform of the active light 40 emitted from the light-emitting unit 11 to the distance measurement target 20. Here, the distance measurement target 20 placed at a distance L includes a material such as metal and causes no subsurface scattering. In this case, the light received at the light-receiving unit 12 has a waveform illustrated in FIG. 5B.

The sum total of an attenuation due to traveling in a distance 2×L and an attenuation due to the reflectivity of the distance measurement target 20 is represented as an attenuation h. When the light emitted from the light-emitting unit 11 is reflected from the distance measurement target 20 and received by the light-receiving unit 12, the intensity of the light is represented by the following expression.

[Expression 3]

$$\frac{h}{\sqrt{2\pi}\,\sigma} \exp\left(-\frac{\left(t-\frac{2L}{c}\right)^2}{2\sigma^2}\right) \tag{3}$$

The expression (3) is a normal distribution taking into consideration the attenuation h and a time delay 2L/c. It is to be noted that, because no subsurface scattering occurs, the standard deviation is $\sigma$ as in the case of the light from the light-emitting unit 11.

Further, in FIG. 5B, reception of the light from the sun 30 (the environment light) is also taken into consideration. The environment light is always constant. Thus, in a case where an environment light component has an intensity E, the light received by the light-receiving unit 12 has an intensity represented by the following expression.

[Expression 4]

$$E + \frac{h}{\sqrt{2\pi}\,\sigma} \exp\left(-\frac{\left(t-\frac{2L}{c}\right)^2}{2\sigma^2}\right) \tag{4}$$

In the case illustrated in FIG. 5B, a peak position is located at a time 2L/c. Thus, the distance L is accurately determined by detecting the peak position and multiplying the peak position by c/2.

Next, the case in which subsurface scattering occurs at the distance measurement target 20 placed at the distance L is considered. In this case, light received at the light-receiving unit 12 has a waveform illustrated in FIG. 5C.

When the light emitted from the light-emitting unit 11 is reflected from the distance measurement target 20 and received by the light-receiving unit 12, the intensity of the light is a light intensity obtained in a case where subsurface scattering occurs. Thus, the intensity is determined by a convolution operation (convolution) using the expression (1) and the expression (2). That is, the intensity is a Gaussian distribution changed in an exponential manner. Specifically, the intensity is represented by the following expression.

[Expression 5]

$$E + h\frac{\lambda}{2} \exp\left\{\frac{\lambda}{2}\left(2\mu + \lambda\sigma^2 - 2t\right)\right\} \text{erfc}\left(\frac{\mu + \lambda\sigma^2 - t}{\sqrt{2}\,\sigma}\right) \tag{5}$$

It is to be noted that the expression (5) also takes into consideration the attenuation h. Further, the expression (5) takes into consideration the intensity E of the light from the sun 30 (the environment light). Here, $\mu$ in the expression (5) is represented as the following expression.

[Expression 6]

$$\mu = \frac{2L}{c} \tag{6}$$

That is, $\mu$ is a light roundtrip time to the distance measurement target 20.

In a case illustrated in FIG. 5C, i.e., in a case where subsurface scattering occurs at the distance measurement target 20 placed at the distance L, the peak position is located behind the time 2L/c. Thus, the distance L is not accurately determined by detecting the peak position and multiplying the peak position by c/2.

To address this, in the distance measuring apparatus 10 according to the present embodiment, the operation unit 15 corrects the distance calculated on the basis of the time corresponding to the peak of the histogram obtained by the accumulator 14 on the basis of the shape of the histogram, more specifically, the spreading state around the peak of the histogram. This makes it possible to accurately calculate the distance L to the distance measurement target 20 even if the distance measurement target 20 is an object that generates subsurface scattering.

[Functional Block of Operation Unit]

The operation unit 15 calculates the distance to the distance measurement target on the basis of the time corresponding to the peak of the histogram acquired by the histogram acquiring unit including the time difference detector 13 and the accumulator 14. Further, the operation unit 15 performs the process of correcting the calculated distance on the basis of the shape of the histogram. The operation unit 15 may be configured by a CPU, for example, and has functional units described below to perform the above-described process. An example of a functional block diagram of the operation unit 15 is illustrated in FIG. 6.

The operation unit 15 includes various functional units including an occurrence rate calculator 151, an environment light arrival rate calculator 152, an active light arrival rate calculator 153, an average and standard deviation calculator 154, a $\lambda$ calculator 155, a correction processor 156, and a c/2 multiplier 157.

The occurrence rate calculator 151 calculates an occurrence rate on the basis of the histogram h(n) produced at the accumulator 14. The occurrence rate is the number of times of generation of a certain event per unit time. Thus, the term "occurrence rate" used herein refers to the number of times of arrival of a photon at the SPAD element of the light-receiving unit 12 per unit time. The occurrence rate in each bin is the probability of arrival of a photon within a time corresponding to the bin. The occurrence rate in a bin n is represented by p(n).

The environment light arrival rate calculator 152 calculates the probability of arrival of the light from the sun 30 (the environment light) at the SPAD element of the light-receiving unit 12. The active light arrival rate calculator 153 calculates the probability of arrival of the active light from the light-emitting unit 11 at the SPAD element of the light-receiving unit 12 by subtracting the rate of arrival of the environment light determined by the environment light arrival rate calculator 152 from the occurrence rate p(n) determined by the occurrence rate calculator 151.

Now, the process of calculating the probability of arrival of the active light at the SPAD element of the light-receiving unit 12 is described in more specific with reference to waveform diagrams of FIGS. 7A and 7B. It is to be noted that the waveform diagram of FIG. 7A is the same as the waveform diagram of FIG. 5C.

The active light arrival rate calculator 153 subtracts the rate of arrival of the environment light determined by the environment light arrival rate calculator 152 from the occurrence rate p(n) determined by the occurrence rate calculator 151 to thereby obtain waveform data illustrated in FIG. 7B. That is, the waveform data illustrated in FIG. 7B is obtained by subtracting the environment light component E from the occurrence rate p(n). The waveform illustrated in FIG. 7B represents a change over time in the probability of arrival of the active light from the light-emitting unit 11 at the SPAD element of the light-receiving unit 12. It is to be noted that, in FIG. 7B, an average of the Gaussian distribution changed in an exponential manner is represented as $\mu+(1/\lambda)$, and a standard deviation is represented as $\sqrt{\{\sigma2+(1/\lambda2)\}}$.

The average and standard deviation calculator 154 calculates the average and the standard deviation of the probability of arrival of the active light from the light-emitting unit 11 at the SPAD element of the light-receiving unit 12 determined by the active light arrival rate calculator 153. The $\lambda$ calculator 155 calculates the object-specific value $\lambda$ on the basis of the width (the standard deviation) $\sigma$ of the active light emitted from the light-emitting unit 11 to the distance measurement target 20, and the standard deviation $(=\sqrt{\{\sigma2+(1/\lambda2)\}})$ determined by the average and standard deviation calculator 154. It is to be noted that the object-specific value $\lambda$ is a known value.

The correction processor 156 subtracts a correction amount $1/\lambda$ from the average determined by the average and standard deviation calculator 154 to thereby determine the light roundtrip time $\mu$ to the distance measurement target 20. That is, as illustrated in FIG. 7C, the correction processor 156 subtracts the correction amount $1/\lambda$ from the average value $(=\mu+(1/\lambda))$ determined by the average and standard deviation calculator 154, i.e., the peak of the reflected light distribution, to thereby perform a distance correction process.

The c/2 multiplier 157 multiplies the time (the light roundtrip time $\mu$) determined by the light roundtrip time calculator 156 by c/2 (where c is a light speed), and outputs the multiplied value as a distance measurement result. The distance measurement result is the distance L to the distance measurement target 20 accurately determined taking into consideration the time attributed to the subsurface scattering inside the distance measurement target 20.

[Distance Measuring Method]

Next, a processing procedure of the distance measuring method executed by the operation unit 15 in the distance measuring apparatus 10 according to the present embodiment illustrated in FIG. 1 under the control of the control unit 16 is described with reference to a flowchart of FIG. 8. In a case where the functions of the operation unit 15 are achieved by an CPU, the process of the distance measuring method is executed under the control of the CPU of the operation unit 15.

In the distance measuring apparatus 10 according to the present embodiment illustrated in FIG. 1, the accumulator 14 produces the histogram h(n) indicating the frequency of reception of reflected light at the light-receiving unit 12. The operation unit 15 performs a process of calculating an accurate distance from the histogram h(n).

(Distance Measuring Process Performed by Operation Unit)

First, the CPU of the operation unit 15 (hereinafter simply referred to as "CPU") acquires the histogram h(n) produced by the accumulator 14 (Step S1), and then calculates the occurrence rate p(n) which is the probability of arrival of a photon at the SPAD element of the light-receiving unit 12 on the basis of the histogram h(n) (Step S2). The process of calculating the occurrence rate p(n) will be described later.

It is to be noted that in a case where the calculation of the occurrence rate p(n) takes time and faster calculation is demanded, an approximation, H(n)=h(n) may be made. That is, the occurrence rate p(n) may be approximated as being same as the histogram. The approximation allows the calculation processing time in Step S2 to be substantially negligible.

Thereafter, the CPU calculates the probability of arrival of the light from the sun 30 (the environment light) at the SPAD element of the light-receiving unit 12 (Step S3), and then calculates the probability of arrival of the light from the light-emitting unit 11 (the active light) at the SPAD element of the light-receiving unit 12 by subtracting the rate of arrival of the environment light determined in Step S3 from the occurrence rate determined in Step S2 (Step S4). The process of calculating the probability of arrival of the environment light at the SPAD element of the light-receiving unit 12 will be described later.

FIG. 7A illustrates a waveform of light received at the SPAD element of the light-receiving unit 12 in a case where the distance measurement target 20 occurs subsurface scattering. FIG. 7B illustrates a waveform indicating a change over time in the probability of arrival of the active light from the light-emitting unit 11 at the SPAD element of the light-receiving unit 12. The waveform illustrated in FIG. 7B is a waveform obtained by subtracting the environment light component E illustrated in FIG. 7A from the occurrence rate p(n) determined in Step S2. It is to be noted that, in FIG. 7B, the average of the Gaussian distribution changed in an exponential manner is $\mu+(1/\lambda)$, and the standard deviation is $\sqrt{\{\sigma 2+(1/\lambda 2)\}}$.

Thereafter, the CPU calculates an average and a standard deviation of the probability of arrival of the active light from the light-emitting unit 11 at the SPAD element of the light-receiving unit 12 determined in Step S4 (FIG. 7B) (Step S5). Thereafter, the CPU calculates the object-specific value $\lambda$ on the basis of the width (standard deviation) $\sigma$ of the active light from the light-emitting unit 11 and the standard deviation of the probability of arrival at the light-receiving unit 12 determined in Step S5 (Step S6). Specifically, the CPU calculates the object-specific value $\lambda$ on the basis of the standard deviation $(=\sqrt{\{\sigma 2+(1/\lambda 2)\}})$ determined in Step S5. It is to be noted that the object-specific value $\lambda$ is a known value.

Thereafter, as illustrated in FIG. 7C, the CPU subtracts $1/\lambda$ from the average of the probability of arrival at the light-receiving unit 12 determined in Step S5 to thereby determine the light roundtrip time $\mu$ to the distance measurement target 20 (Step S7). Thereafter, the CPU multiplies the time determined in Step S7, i.e., the light roundtrip time $\mu$ to the distance measurement target 20 by c/2, and outputs the resultant value as the distance measurement result (Step S8). The CPU then ends the series of processes of the distance measuring method.

Now, a supplementary explanation for the series of processes of the distance measuring method described above is made with reference to FIGS. 7B and 7C.

The data illustrated in FIG. 7B represents the change over time in the probability of arrival of the light from the light-emitting unit 11 (the active light) at the SPAD element of the light-receiving unit 12. The average thereof is $\mu+(1/\lambda)$, and the standard deviation thereof is $\sqrt{\{\sigma 2+(1/\lambda 2)\}}$. Accordingly, it is possible to determine the object-specific value $\lambda$ using the known width (standard deviation) a of the active light and determine the light roundtrip time $\mu$ to the distance measurement target 20. This calculation is illustrated in FIG. 7C. It is possible to calculate the light roundtrip time $\mu$ to the distance measurement target 20 by subtracting $1/\lambda$ from the average of the Gaussian distribution changed in an exponential manner (FIG. 7B).

The light roundtrip time $\mu$ to the distance measurement target 20 has a relation represented by the expression 6. Thus, it is possible to accurately calculate the distance L to the distance measurement target 20 in the process at Step S8.

Applying the technology according to the present disclosure as described above makes it possible to accurately measure the distance L to the distance measurement target 20 in which subsurface scattering is occurring.

Although the explanation, "the value of $\sigma$ is measured in advance and thus a known value" is made in the above description, the following process may be performed if the value of $\sigma$ is not a known value. That is, skewness is further determined in Step S5 in which the average and the standard deviation are determined. Further, the value of $\sigma$ may be determined using a calculation indicated in a document: Olivier J., Norberg, M. M., (2010). Positively Skewed Data: Revisiting the Box-Cox Power Transformation. International Journal of Psychological Research, 3(1), 68-75.

(Process of Calculating Occurrence Rate)

Next, a description is made regarding the process at Step S2 described above, i.e., the process of calculating the occurrence rate p(n) (the probability of arrival of a photon at the SPAD element of the light-receiving unit 12). FIG. 9 is a flowchart illustrating an example of the process of calculating the occurrence rate. The process is also executed under the control of the CPU of the operation unit 15.

First, the CPU inputs the numerical value M, which is the number of times of the measurement that have been performed to produce the histogram (Step S21), and thereafter acquires data on the histogram produced by the accumulator 14 (Step S22). Specifically, in Step S22, the CPU acquires a frequency h(n) in each bin n of the histogram. Here, n is 0 to N−1.

After acquiring the frequency h(n) in each bin n of the histogram, the CPU calculates M(n−1) defined by the following expression (7) (Step S23).

[Expression 7]

$$M_{(n-1)} = M - \sum_{j=0}^{n+1} h_{(j)} \tag{7}$$

The expression (7) represents the probability of the frequency in a bin n becoming h(n) regardless of h(m) times occurrence in a bin m through the measurement conducted M times. Here, n is 0 to N−1.

Thereafter, the CPU performs a calculation, H(n)=h(n)/M(n−1) where n is 0 to N−1 (Step S24). It is to be noted that H(n) is an average of a normal distribution represented by the following expression (8), i.e., the occurrence rate p(n).

[Expression 8]

$$H_{(n)} = \frac{h_{(n)}}{M_{(n-1)}} \tag{8}$$

Thereafter, the CPU performs a calculation, $\sigma(n)=\sqrt{(1/M}$ (n−1)×h(n)/M(n−1)×{1−(h(n)/M(n−1))}, where n is 0 to N−1 (Step S25). It is to be noted that σ(n) is a standard deviation of the normal distribution of the expression (8). Thereafter, the CPU outputs H(n) as the occurrence rate p(n), and σ(n) as the standard deviation, where n is 0 to N−1. The CPU then ends the series of processes of calculating the occurrence rate p(n), and the flow returns to Step S3 in FIG. 8.

(Process of Calculating Probability of Arrival of Environment Light)

Next, a description is made regarding the process at Step S3 described above, i.e., the process of calculating an environment light arrival probability (the probability of arrival of the environment light from the sun 30 at the SPAD element of the light-receiving unit 12). FIG. 10 is a flowchart illustrating an example of the process of calculating the probability of arrival of the environment light at the SPAD element. The process is also executed under the control of the CPU of the operation unit 15.

In the process of calculating the environment light arrival probability, the occurrence rate p(n), which is determined in the process at Step S2 in FIG. 8, i.e., the process of calculating the occurrence rate described with reference to FIG. 9, is used. First, the CPU acquires the occurrence rate p(n) determined in the process of calculating the occurrence rate described with reference to FIG. 9 (Step S31). Thereafter, the CPU determines an environment light arrival probability Iambient, which is the probability of arrival of the environment light at the SPAD element of the light-receiving unit 12 (Step S32). The environment light arrival probability Iambient satisfies the following expression (9).

[Expression 9]

$$I_{ambient} = \arg\max_{I} \left| \left\{ n \left| H_{(n)} - \frac{\sigma_{(n)}}{2} \le I \le H_{(n)} + \frac{\sigma_{(n)}}{2} \right. \right\} \right| \quad (9)$$

Lastly, the CPU outputs the environment light arrival probability Iambient as a luminance value obtained when the distance measurement target 20 is irradiated with the environment light (Step S33), and ends the series of processes of calculating the environment light arrival probability Iambient.

As described above, in the distance measuring apparatus or the distance measuring method according to the present embodiment, the spreading state around the peak in the time direction is measured in terms of the histogram indicating the frequency of reception of reflected light at the light-receiving unit 12 (or the occurrence rate calculated therefrom). For example, in a case where the light outputted from the distance measurement target 20 as a result of subsurface scattering is able to be approximated as an exponential distribution (the expression (1)), a standard deviation is determined as the spreading state.

Further, the correction amount regarding a subsurface scattering component is calculated on the basis of the spreading state around the peak in the time direction. For example, in a case where the light from the light-emitting unit 11 (the active light) is able to be approximated as a normal distribution (the expression (2)) and where the light outputted from the distance measurement target 20 as a result of the subsurface scattering is able to be approximated as an exponential distribution (the expression (1)), the exponential distribution parameter λ is determined, and the inverse thereof is set as the correction amount.

Further, the calculated correction amount is subtracted from the distance measurement result, which allows for accurate measurement of the distance L. For example, in a case where the light from the light-emitting unit 11 (the active light) is able to be approximated as a normal distribution (the expression (2)) and where the light outputted from the distance measurement target 20 as a result of the subsurface scattering is able to be approximated as an exponential distribution (the expression (1)), the correction amount (1/λ) is subtracted from the average of the histogram (or the occurrence rate calculated therefrom). This allows for accurate measurement of the distance L.

Modification Example

Although the above description is made on the basis of some preferred embodiments of the technology of the present disclosure, the technology of the present disclosure should not be limited to these embodiments. The configuration and structure of the distance measuring apparatus described in the above-described embodiments are mere examples and may be modified as appropriate.

Application Example of Technology of Present Disclosure

The technology of the present disclosure described above may be mounted for use on various kinds of electronic devices with a face authentication function, for example. Examples of the electronic devices with a face authentication function may include mobile devices such as smartphones, digital cameras, tablets, and personal computers. However, the electronic device to which the technology of the present disclosure is applicable should not be limited to these mobile devices.

Here, a smartphone with a face authentication function is exemplified as a specific example of the electronic device to which the technology of the present disclosure is applicable. FIG. 11 is an external view of a smartphone according to a specific example of the electronic device to which the technology of the present disclosure is applicable, as seen from a front side.

A smartphone 100 according to the specific example includes a body 110 and a display 120 provided on a front face of the body 110. The smartphone 100 further includes the light-emitting unit 11 and the light-receiving unit 12 of the distance measuring apparatus 10 according to the above-described embodiment. The light-emitting unit 11 and the light-receiving unit 12 are provided on an upper portion of the front face of the body 110, for example. It is to be noted that the positions at which the light-emitting unit 11 and the light-receiving unit 12 of the distance measuring apparatus 10 are provided should not be limited to those on the upper portion of the front face of the body 110.

The distance measuring apparatus 10 according to the above-described embodiment is mountable on the smartphone 100 according to the specific example. This enables the smartphone 100 to have a function to recognize the three-dimensional shape of an object, for example, a face authentication function. In particular, the distance measuring apparatus 10 makes it possible to accurately measure the distance to the distance measurement target while taking into consideration the time attributed to the subsurface scattering. Thus, the distance measuring apparatus 10 makes it possible to perform face authentication with higher certainty, for example.

Possible Configurations of Present Disclosure

It is to be noted that the present disclosure may also have the following configurations.

<<A. Distance Measuring Apparatus>>

[A-01]

A distance measuring apparatus including:

a light-receiving unit that receives reflected light from a distance measurement target, the reflected light being based on irradiation light from a light-emitting unit;

a histogram acquiring unit that acquires a histogram indicating a frequency of reception of the reflected light at the light-receiving unit; and an operation unit that calculates a distance to the distance measurement target on the basis of a time corresponding to a peak of the histogram acquired by the histogram acquiring unit, in which the operation unit corrects the distance calculated on the basis of the time corresponding to the peak of the histogram on the basis of a shape of the histogram acquired by the histogram acquiring unit.

[A-02]

The distance measuring apparatus according to [A-01] described above, in which a light-receiving element of the light-receiving unit is an avalanche photodiode that operates in a Geiger mode.

[A-03]

The distance measuring apparatus according to [A-02] described above, in which the light-receiving element of the light-receiving unit is a single-photon avalanche diode.

[A-04]

The distance measuring apparatus according to any one of [A-01] to [A-03] described above, in which the distance measurement target is an object that causes subsurface scattering.

[A-05]

The distance measuring apparatus according to [A-04] described above, in which the histogram acquiring unit includes a time difference detector that detects a time from a time point when the light-emitting unit emits the irradiation light to reception of the reflected light from the distance measurement target at the light-receiving unit, and an accumulator that produces a histogram on the basis of the time detected by the time difference detector.

[A-06]

The distance measuring apparatus according to any one of [A-01] to [A-05] described above, in which the shape of the histogram is a spreading state around a peak of a distribution of the reflected light from the distance measurement target, the spreading state being obtained by conducting a predetermined statistical process on the histogram acquired by the histogram acquiring unit.

[A-07]

The distance measuring apparatus according to [A-06] described above, in which the operation unit measures the spreading state around the peak of the distribution of the reflected light from the distance measurement target, calculates a correction amount from the spreading state around the peak, and performs correction on the basis of the correction amount calculated.

[A-08]

The distance measuring apparatus according to [A-07] described above, in which the operation unit performs the correction of the distance by subtracting the correction amount calculated from the spreading state around the peak from the peak of the distribution of the reflected light.

[A-09]

The distance measuring apparatus according to [A-08] described above, in which the distribution of the reflected light is a distribution obtained by subtracting an environment light component from the histogram acquired by the histogram acquiring unit.

[A-10]

The distance measuring apparatus according to [A-01] described above, in which the spreading state around the peak of the distribution of the reflected light is a standard deviation.

[A-11]

The distance measuring apparatus according to [A-10] described above, in which the correction amount calculated from the spreading state around the peak is an inverse of an exponential distribution parameter determined from the standard deviation.

<<B. Distance Measuring Method>>

[B-01]

A distance measuring method that causes a distance measuring apparatus including a light-receiving unit that receives reflected light from a distance measurement target, the reflected light being based on irradiation light from a light-emitting unit, and a histogram acquiring unit that acquires a histogram indicating a frequency of reception of the reflected light at the light-receiving unit to calculate a distance to the distance measurement target on the basis of a time corresponding to a peak of the histogram acquired by the histogram acquiring unit, and correct the distance calculated on the basis of the time corresponding to the peak of the histogram on the basis of a shape of the histogram acquired by the histogram acquiring unit.

[B-02]

The distance measuring method according to [B-01] described above, in which a light-receiving element of the light-receiving unit is an avalanche photodiode that operates in a Geiger mode.

[B-03]

The distance measuring method according to [B-02] described above, in which the light-receiving element of the light-receiving unit is a single-photon avalanche diode.

[B-04]

The distance measuring method according to any one of [B-01] to [B-03] described above, in which the distance measurement target is an object that causes subsurface scattering.

[B-05]

The distance measuring method according to [B-04] described above, in which the histogram acquiring unit includes a time difference detector that detects a time from a time point when the light-emitting unit emits the irradiation light to reception of the reflected light from the distance measurement target at the light-receiving unit, and an accumulator that produces a histogram on the basis of the time detected by the time difference detector.

[B-06]

The distance measuring method according to any one of [B-01] to [B-05] described above, in which the shape of the histogram is a spreading state around a peak of a distribution of the reflected light from the distance measurement target, the spreading state being obtained by conducting a predetermined statistical process on the histogram acquired by the histogram acquiring unit.

[B-07]

The distance measuring method according to [B-06] described above, in which the operation unit measures the spreading state around the peak of the distribution of the reflected light from the distance measurement target, calculates a correction amount from the spreading state around the peak, and performs correction on the basis of the correction amount calculated.

[B-08]

The distance measuring method according to [B-07] described above, in which the operation unit performs the correction of the distance by subtracting the correction amount calculated from the spreading state around the peak from the peak of the distribution of the reflected light.

[B-09]

The distance measuring method according to [B-08] described above, in which the distribution of the reflected light is a distribution obtained by subtracting an environment light component from the histogram acquired by the histogram acquiring unit.

[B-10]

The distance measuring method according to [B-01] described above, in which the spreading state around the peak of the distribution of the reflected light is a standard deviation.

[B-11]

The distance measuring method according to [B-10] described above, in which the correction amount calculated from the spreading state around the peak is an inverse of an exponential distribution parameter determined from the standard deviation.

This application claims the benefit of Japanese Priority Patent Application JP2020-175913 filed with the Japan Patent Office on Oct. 20, 2020, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A distance measuring apparatus, comprising:

a light-receiving unit configured to receive reflected light from a distance measurement target, wherein the reflected light is based on irradiation light from a light-emitting unit;

a histogram acquiring unit configured to acquire a histogram indicating a frequency of reception of the reflected light at the light-receiving unit; and an operation unit configured to:

calculate a distance to the distance measurement target based on a time corresponding to a peak of the histogram acquired by the histogram acquiring unit, and correct the calculated distance based on a shape of the histogram acquired by the histogram acquiring unit, wherein the shape of the histogram comprises a spreading state around a peak of a distribution of the reflected light from the distance measurement target, and the spreading state is obtained based on conduction of a specific statistical process on the histogram acquired by the histogram acquiring unit.

2. The distance measuring apparatus according to claim 1, wherein a light-receiving element of the light-receiving unit comprises an avalanche photodiode configured to operate in a Geiger mode.

3. The distance measuring apparatus according to claim 2, wherein the light-receiving element of the light-receiving unit comprises a single-photon avalanche diode.

4. The distance measuring apparatus according to claim 1, wherein the distance measurement target is an object that causes subsurface scattering.

5. The distance measuring apparatus according to claim 4, wherein the histogram acquiring unit includes a time difference detector configured to detect a time from a time point when the light-emitting unit emits the irradiation light to reception of the reflected light from the distance measurement target at the light-receiving unit, and an accumulator configured to produce the histogram based on the time detected by the time difference detector.

6. The distance measuring apparatus according to claim 1, wherein the operation unit is further configured to:

measure the spreading state around the peak of the distribution of the reflected light from the distance measurement target, calculate a correction amount from the spreading state around the peak, and perform correction based on the calculated correction amount calculated.

7. The distance measuring apparatus according to claim 6, wherein the operation unit is further configured to perform the correction of the distance based on subtraction of the correction amount calculated from the spreading state around the peak from the peak of the distribution of the reflected light.

8. The distance measuring apparatus according to claim 7, wherein the distribution of the reflected light is a distribution obtained based on subtraction of an environment light component from the histogram acquired by the histogram acquiring unit.

9. The distance measuring apparatus according to claim 8, wherein the spreading state around the peak of the distribution of the reflected light comprises a standard deviation.

10. The distance measuring apparatus according to claim 9, wherein the correction amount calculated from the spreading state around the peak comprises an inverse of an exponential distribution parameter determined from the standard deviation.

11. A distance measuring method, comprising:

in a distance measuring apparatus:

receiving reflected light from a distance measurement target, wherein the reflected light is based on irradiation light from a light-emitting unit;

acquiring a histogram indicating a frequency of reception of the reflected light;

calculating a distance to the distance measurement target based on a time corresponding to a peak of the acquired histogram; and correcting the calculated distance based on a shape of the acquired histogram, wherein the shape of the histogram comprises a spreading state around a peak of a distribution of the reflected light from the distance measurement target, and the spreading state is obtained based on conduction of a specific statistical process on the acquired histogram.

* * * * *